United States Patent
Doyle

(10) Patent No.: US 7,489,274 B2
(45) Date of Patent: Feb. 10, 2009

(54) SYSTEM AND METHOD FOR GENERATING A VERY HIGH FREQUENCY OMNIDIRECTIONAL RANGE SIGNAL

(75) Inventor: Robert S. Doyle, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/563,397

(22) Filed: Nov. 27, 2006

(65) Prior Publication Data

US 2008/0122694 A1    May 29, 2008

(51) Int. Cl.
 *G01S 1/44* (2006.01)
(52) U.S. Cl. ............... 342/404; 342/402; 342/405
(58) Field of Classification Search ............ 342/401, 342/402, 404, 405, 418
See application file for complete search history.

(56) References Cited

U.S. PATENT DOCUMENTS

| | | | | |
|---|---|---|---|---|
| 3,513,385 A | * | 5/1970 | Pascoe | 324/621 |
| 3,845,484 A | * | 10/1974 | Sawicki et al. | 342/401 |
| 3,919,706 A | * | 11/1975 | Grimm et al. | 341/111 |
| 4,382,259 A | | 5/1983 | Becavin et al. | 343/106 D |
| 4,438,503 A | * | 3/1984 | White et al. | 708/276 |
| 4,633,198 A | * | 12/1986 | Goetz et al. | 342/200 |
| 6,614,396 B2 | | 9/2003 | Pina et al. | 342/401 |

OTHER PUBLICATIONS

"Aeroflex Announces New IFR 4000 Navigation Communications Ramp Test Set," AEROFLEX, Mar. 10, 2003.
"Agilent E4438C ESG Vector Signal Generator," Agilent Technologies, www.agilent.com/find/esg, May 20, 2002.
Van Rossum, Guido, "Python Programming Language," Apr. 27, 2006, www.python.org.
"Minimum Performance Specification for Airborne For Receiving Equipment," Jan. 1988 ED-22B.

* cited by examiner

*Primary Examiner*—Dao L Phan
(74) *Attorney, Agent, or Firm*—McDonnell Boehnen Hulbert & Berghoff LLP

(57) ABSTRACT

A system and method for generating signals for testing a Very High Frequency Omnidirectional Range (VOR) receiver is described. The system includes a waveform generator and a signal generator. The waveform generator generates a waveform representing a waveform generated by a VOR ground station during operation of a VOR system. The signal generator receives the waveform from the waveform generator and generates a signal for testing the VOR receiver.

17 Claims, 7 Drawing Sheets

```
                                    CF  107.98945 MHz  Real Time OFF
  Ref Lvl                           DEMOD BW:    5 kHz  MOD SUMMARY FM
  -20 dBm                                                ANALOG DEMOD MODULATION SUMMARY FM
  FM:          496.931   Hz +Pk        -486.456  Hz -Pk
               491.693   Hz ⇧Pk/2       340.001  Hz RMS
  SINAD 1 kHz:   --
  AUDIO FREQ:   30.000   Hz
  FREQ ERROR:  -139.472  Hz
  CARR PWR:    -36.42    dBm
  FILTER:   HP --          LP none           DEEMPH --
                                              PRE DISP --

AM:           30.38  % ⇧Pk/2
  PM:           23.921 rad ⇧Pk/2
```

Fig. 7

SYSTEM AND METHOD FOR GENERATING A VERY HIGH FREQUENCY OMNIDIRECTIONAL RANGE SIGNAL

FIELD

The present invention relates generally to testing a Very High Frequency Omnidirectional Range (VOR) receiver, and more particularly, relates to generating signals needed for testing the VOR receiver.

BACKGROUND

Generally, a VOR system includes ground stations and receivers. The ground stations transmit navigation guidance signals used by aircraft in flight. The aircraft includes a VOR receiver for receiving the signals transmitted by the ground stations. The VOR system may be described as a classical VOR (CVOR) or a Doppler VOR (DVOR) system.

In CVOR, the ground station transmits a rotating cardioid shaped antenna horizontal radiation pattern at thirty revolutions per second and a fixed omni-directional carrier pattern. The receiver obtains a carrier that is amplitude modulated with a 30 Hz sine wave, the phase of which is dependent on the azimuth position of the aircraft in relation to the ground station. In order to use the bearing information, the ground station provides a reference by amplitude modulating the carrier with a sub-carrier of 9960 Hz, which is, in turn, frequency modulated by a 30 Hz sine wave with a deviation of ±480 Hz. The phase of the 30 Hz frequency modulation is independent of azimuth. The aircraft bearing in relation to the ground station is calculated by taking the phase difference of the two 30 Hz sine waves.

DVOR employs two fundamental principles: the Doppler effect for generating frequency modulated (FM) and bearing information, and a wide aperture antenna array for minimizing the effects of multipath propagation. To maintain compatibility with CVOR receivers, DVOR ground stations radiate signals with the same frequency spectrum as the CVOR ground stations, but the azimuth-dependent information is contained in the phase of the frequency modulated signal. In DVOR, the carrier with a 30 Hz amplitude modulation is radiated from an omni-directional antenna and is the reference signal. The direction dependent signal is generated in space by rotating the radiated 9960 Hz sidebands on a circle.

The circular motion is electronically simulated by a number of antennas equally spaced around the circle, which are sequentially fed with radio frequency (RF) energy so that a continuous movement of the radiating source is achieved. The DVOR receiver sees a Doppler shift of sideband frequencies deviating ±480 Hz thirty times a second. The DVOR system may be a single sideband DVOR, a doubled sideband DVOR, or an alternating double sideband DVOR system.

The European Organisation for Civil Aviation Electronics (EUROCAE) has specified minimum performance requirements suitable for airborne VOR receivers. These specifications can be found in EUROCAE document ED-22B (January 1988), which is hereby incorporated by reference in its entirety. The ED-22B document includes compatibility requirements with DVOR ground stations. (See, Chapter 3, paragraph 3.2.2.2.)

To verify that the VOR receiver meets the compatibility requirements with VOR ground stations, the ED-22B document provides test procedures. (See, Chapter 5, paragraph 5.2.3.3.) As described in the ED-22B document, DVOR signal generators are not currently available, so the document provides a list of the equipment needed for each of the tests and a diagram showing how to arrange the equipment to perform the test. For example, the first test requires an oscilloscope, an RF signal generator, an audio frequency (AF) VOR signal generator (with separate 30 Hz and 9960 Hz outputs), an AF signal generator, an amplitude modulating (AM) modulator, and a deviation indicator or microammeter of equivalent resistance. FIG. 5-2 of the ED-22B document depicts the arrangement of the equipment to simulate the DVOR signal as required by the first test.

Due to the numerous pieces of equipment needed to perform the tests, the test environment for testing the VOR receiver is less than desirable. In general, this test environment may have issues with calibration, accuracy, and repeatability. The tests may fail, not because of a VOR receiver failure, but because of a problem in the test setup. For example, if one of the pieces of equipment is not calibrated properly, the VOR signal may not be properly simulated for the test. Other problems may also occur due to, for example, as poor connections between equipment, incompatibility between equipment, and equipment failures.

Thus, it would be beneficial to have an improved method of generating VOR signals for testing a VOR receiver.

SUMMARY

A system and method for generating signals for testing a VOR receiver is described. In one example, the system includes a signal generator that receives repetitive discrete time sampled waveform data. The signal generator uses the data to generate an analog Doppler VOR signal for testing the VOR receiver. The signal generator may be a vector signal generator. The Doppler VOR signal may be either a double sideband Doppler VOR signal or an alternating sideband Doppler VOR signal.

In another example, the system includes a waveform generator that generates at least one waveform representing a waveform generated by a VOR ground station during operation of a VOR system, and a signal generator that receives the at least one generated waveform from the waveform generator and generates a signal for testing the VOR receiver. Preferably, the waveform generator is a software program.

The waveform generator uses at least one equation representing at least one of a classical VOR baseband signal, a double sideband Doppler VOR signal, and an alternating sideband Doppler VOR signal to generate the at least one waveform. The waveform generator converts the at least one equation into a repetitive discrete time sampled waveform.

The classical VOR baseband signal may be represented as $\text{vor}(t)=1+m_v \cos(\omega_m t-\theta)+m_r \cos(\omega_{sc} t-m_{sc} \sin(\omega_m t))$, where $m_v$ is a modulation index of variable signal, $m_r$ is a modulation index of reference signal, $m_{sc}$ is a deviation ratio of the FM subcarrier, $\omega_m$ is a radian frequency of reference and variable signal, $\omega_{sc}$ is a radian frequency of the FM subcarrier, and $\theta$=bearing to the VOR station.

The double sideband Doppler VOR signal may be represented by $\text{vor}(t)=1+m_v \cos(\omega_m t-\theta)+m_r \cos(\omega_{sc} t-m_{sc} \sin(\omega mt))(1+m_d \cos(\omega_d t))$, where $m_v$ is a modulation index of variable signal, $m_r$ is modulation index of reference signal, $m_d$ is a modulation index of Doppler signal, $m_{sc}$ is a deviation ratio of the FM subcarrier, $\omega_m$ is a radian frequency of reference and variable signal, $\omega_d$ is a radian frequency of Doppler modulation, $\omega_{sc}$ is a radian frequency of the fin subcarrier, and $\theta$ is a bearing to the VOR station.

The alternating sideband Doppler VOR signal may be represented as:

$$\text{real}(\text{vor}(t))=(1+m_v \cos(\omega_m t-\theta))(\cos(\phi)+m_r \sin(\omega_m t - m_{sc}\sin(\omega_m t)))$$

$$\text{imag}(\text{vor}(t))=(1+m_v \cos(\omega_m t-\theta))(\sin(\phi)+m_r \cos(\omega_m t - m_{sc}\sin(\omega_m t)) * \text{sign}(\omega_d t)$$

where $m_v$ is a modulation index of variable signal, $m_r$ is a modulation index of reference signal, $m_{sc}$ is a deviation ratio of the FM subcarrier, $\omega_m$ is a radian frequency of reference and variable signal, $\omega_d$ is a radian frequency of Doppler modulation, $\omega_{sc}$ is a radian frequency of the fin subcarrier, $\theta$ is a bearing to the VOR station, and $\phi$ is a phase between carrier and sidebands.

The signal for testing the VOR receiver may be an analog signal. The signal generator may be a vector signal generator. The vector signal generator may be a commercial off the shelf (COTS) device. The signal generator may receive the at least one generated waveform via File Transfer Protocol (FTP) over an Ethernet connection.

A method for testing a VOR receiver includes generating at least one waveform representing a waveform generated by a VOR ground station during operation of a VOR system; generating a vector waveform based on the at least one waveform; and applying the vector waveform to the VOR receiver. The method may further include validating the operation of the VOR receiver.

Generating at least one waveform representing a waveform generated by a VOR ground station during operation of a VOR system may include using at least one equation representing at least one of a classical VOR baseband signal, a double sideband Doppler VOR signal, and an alternating sideband Doppler VOR signal to generate the at least one waveform. The at least one equation may be converted into a repetitive discrete time sampled waveform.

Generating a vector waveform based on the at least one waveform may include using a vector signal generator. The vector waveform may be an analog waveform.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein:

FIG. 7 is a screen shot illustrating measurements performed on the 9960 Hz reference waveform.

DETAILED DESCRIPTION

Figure 1:
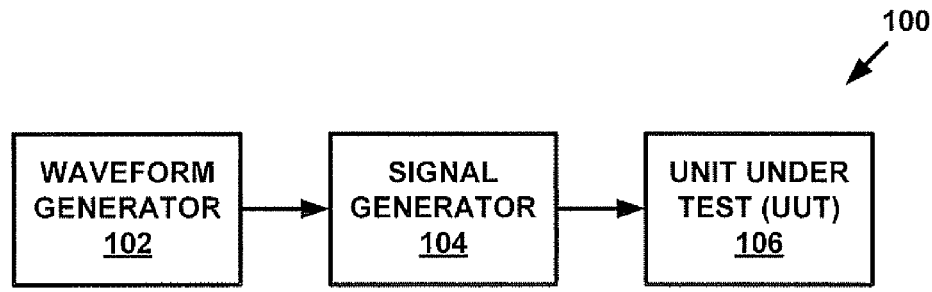
FIG. 1 is a block diagram of a system for generating VOR signals, according to an example.

FIG. 1 is a block diagram of a system 100 for generating VOR signals. The system 100 includes a waveform generator 102 and a signal generator 104. During testing of a unit under test (UUT) 106, the waveform generator 102 provides waveform data to the signal generator 104, which then generates signals for testing the UUT 106. The UUT 106 may be a VOR receiver. However, the signals generated by the signal generator 104 may be used to test other devices as well. Additionally, the signals provided by the signal generator 104 may have additional uses other than testing.

The waveform generator 102 may be any combination of hardware, software, and/or firmware. Preferably, the waveform generator 102 is software. For example, a Python program may be used to generate waveforms. Python is an interpreted programming language that is freely available and supported on many platforms. Additionally, Python supports complex (as in real and imaginary) vector mathematics, which may be needed to generate some waveforms. While Python is used in the following description, it is understood that other programming languages may be used by the waveform generator 102.

The waveform generator 102 may use equations to represent various waveforms. In the example of testing a VOR receiver, the waveform generator 102 may use an equation representing a CVOR baseband signal, a double sideband DVOR signal, and/or an alternating sideband DVOR signal. Of course, the waveform generator 102 may use other equations as well.

The CVOR baseband signal may be represented as:

$$\mathrm{vor}(t)=1+m_v\cos(\omega_m t-\theta)+m_r\cos(\omega_{sc}t-m_{sc}\sin(\omega_m t)) \qquad (1)$$

where:
$m_v$=modulation index of variable signal (0.3 nominally),
$m_r$=modulation index of reference signal (0.3 nominally),
$m_{sc}$=deviation ratio of the FM subcarrier (16 nominally),
$\omega_m$=radian frequency of reference and variable signal ($2\pi 30$ Hz nominally),
$\omega_{sc}$=radian frequency of the FM subcarrier ($2\pi 9960$ Hz nominally), and
$\theta$=bearing to the VOR station.

The DVOR signal is essentially the same waveform as the CVOR waveform except that the amplitude of the 9960 Hz FM subcarrier is additionally AM modulated at 40% in turn at 30 Hz and 60 Hz, and 80% in turn at 1170 Hz, 1440 Hz, and 1500 Hz. The DVOR baseband waveform may be represented as:

$$\begin{aligned}\mathrm{vor}(t)=&1+m_v\cos(\omega_m t-\theta)+m_r\cos(\omega_{sc}t-m_{sc}\sin(\omega_m t))\\&(1+m_d\cos(\omega_d t))\end{aligned} \qquad (2)$$

where:
$m_v$=modulation index of variable signal (0.3 nominally),
$m_r$=modulation index of reference signal (0.3 nominally),
$m_d$=modulation index of Doppler signal (0.4 or 0.8 nominally),
$m_{sc}$=deviation ratio of the FM subcarrier (16 nominally),
$\omega_m$=radian frequency of reference and variable signal ($2\pi 30$ Hz nominally),
$\omega_d$=radian frequency of Doppler modulation,
$\omega_{sc}$=radian frequency of the FM subcarrier ($2\pi 9960$ Hz nominally), and
$\theta$=bearing to the VOR station.

When the Doppler modulation index ($m_d$) is zero, Equation (2) is the same as Equation (1).

The alternating sideband Doppler VOR signal is essentially the same waveform as the CVOR waveform except that the upper sideband and lower sideband of the 9960 Hz subcarrier are alternately deleted at an 1170 Hz rate. This waveform is synthesized using the 'phase shift' or phasing method of generating the single sideband modulation. This technique nulls the suppressed sideband. The upper/lower sideband selection is created by multiplying the quadrature component of the signal by ±1 based on the sign of an 1170 Hz ($\omega_d$) sine wave. The alternating sideband Doppler VOR baseband waveform may be represented as:

$$\text{real}(vor(t)) = (1 + m_v \cos(\omega_m t - \theta))(\cos(\phi) + m_r \sin(\omega_m t - m_{sc} \sin(\omega mt))) \quad (3)$$

$$\text{imag}(vor(t)) = (1 + m_v \cos(\omega_m t - \theta))(\sin(\phi) + m_r \cos(\omega_m t - m_{sc} \sin(\omega mt)^* \text{sign}(\omega_d t))$$

where:
$m_v$=modulation index of variable signal (0.3 nominally),
$m_r$=modulation index of reference signal (0.3 nominally),
$m_{sc}$=deviation ratio of the FM subcarrier (16 nominally),
$\omega_m$=radian frequency of reference and variable signal ($2\pi 30$ Hz nominally),
$\omega_d$=radian frequency of Doppler modulation,
$\omega_{sc}$=radian frequency of the fm subcarrier ($2\pi 9960$ Hz nominally),
$\theta$=bearing to the VOR station, and
$\phi$=phase between carrier and sidebands.

As seen in Equation (3), the alternating sideband Doppler VOR signal requires both in-phase and quadrature waveforms to produce single sideband signals.

Equations (1)-(3) represent continuous time varying waveforms. The waveform generator 102 may decompose or otherwise convert these continuous time varying waveforms into repetitive discrete time sampled waveforms. The collection of digital samples may be chosen such that, when the collection of digital samples is repeated in time, the waveform is correctly generated for longer periods of time. In the example of a VOR receiver, the longest periodic signal is 30 Hz and the other signals are harmonics of 30 Hz. Thus, in this example, the waveform generator 102 generates a $\frac{1}{30}^{th}$ second waveform sequence.

An example Python program for generating Equations (1)-(3) is provided in Appendix A. The example uses the $\frac{1}{30}^{th}$ second period of data described above. As a result of this selection, the Python program requires that all modulation frequencies are an integer multiple of the 30 Hz frequency reference. The modulation tones (including the Doppler components) meet this requirement. Other periods may be selected for generating a repetitive waveform, which may be needed when testing corner-case frequency tolerances.

Once the waveform generator 102 generates the repetitive discrete time sampled waveforms, the waveform generator 102 provides a waveform file to the signal generator 104. The waveform generator 102 may transfer the waveform file to the signal generator 104 via a wired or wireless connection. Additionally, the waveform generator 102 may transfer the waveform file to the signal generator 104 using any protocol now known or developed in the future. For example, the waveform generator 102 may use File Transfer Protocol (FTP) over an Ethernet connection.

Alternatively, the waveform file may be stored on a storage medium, such as a diskette or thumb drive, and uploaded from the storage medium to the signal generator 104. As another alternative, the waveform generator 102 and the signal generator 104 may be co-located, and data in the waveform file may be transferred via a data bus or other communication bus within the combined system. Any other data transfer method may also be used.

Figure 2:
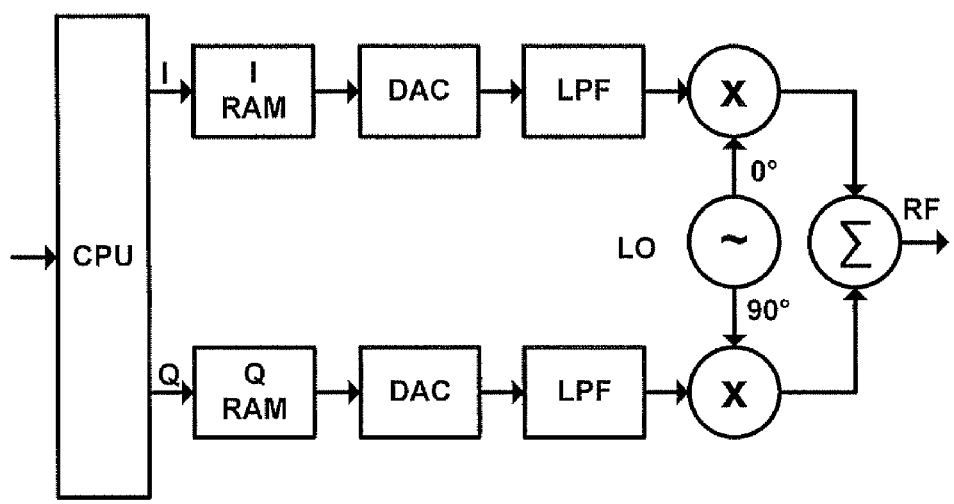
FIG. 2 is a block diagram of a signal generator for use in the system depicted in FIG. 1, according to an example.

The signal generator 104 may be any combination of hardware, software, and/or firmware. Preferably, the signal generator 104 is a vector signal generator having dual arbitrary waveform generators to generate various VOR signals. The vector signal generator may be a commercial off the shelf (COTS) device or a custom designed device. For example, the signal generator 104 may be an Agilent E4438C Signal Generator. A simplified block diagram of the E4438C Signal Generator is depicted in FIG. 2.

Continuing with this signal generator example, the E4438C Signal Generator receives the waveform file from the waveform generator 102 and loads data stored in the file into dual channel arbitrary waveform generator memory. The E4438C Signal Generator includes a built-in reconstruction filter. To ensure compatibility with those filters, the waveform may be generated with four samples per 9960 Hz cycle. The sample clock of the arbitrary waveform generator may be set to 39.840 KHz.

The signal generator 104 generates vector waveforms for testing the UUT 106. In the example of a VOR receiver as the UUT 106, the signal generator 104 generates test waveforms for the CVOR and/or DVOR signals. Per the EUROCAE requirements, the signal generator 104 generates the CVOR signal, the double sideband DVOR signal, and the alternating sideband DVOR signal.

The signal generator 104 may reconstruct or otherwise convert the waveform data received from the waveform generator 102 into analog signals. Because the collection of digital samples from the waveform generator 102 is repeated, the signal generator 104 may repetitively generate its analog signal output. As a result, the time required by the waveform generator 102 to compute the repetitive discrete time sampled waveforms, the time to transfer these waveforms to the signal generator 104, and the storage requirements of the signal generator 104 may be reduced.

Figure 3:
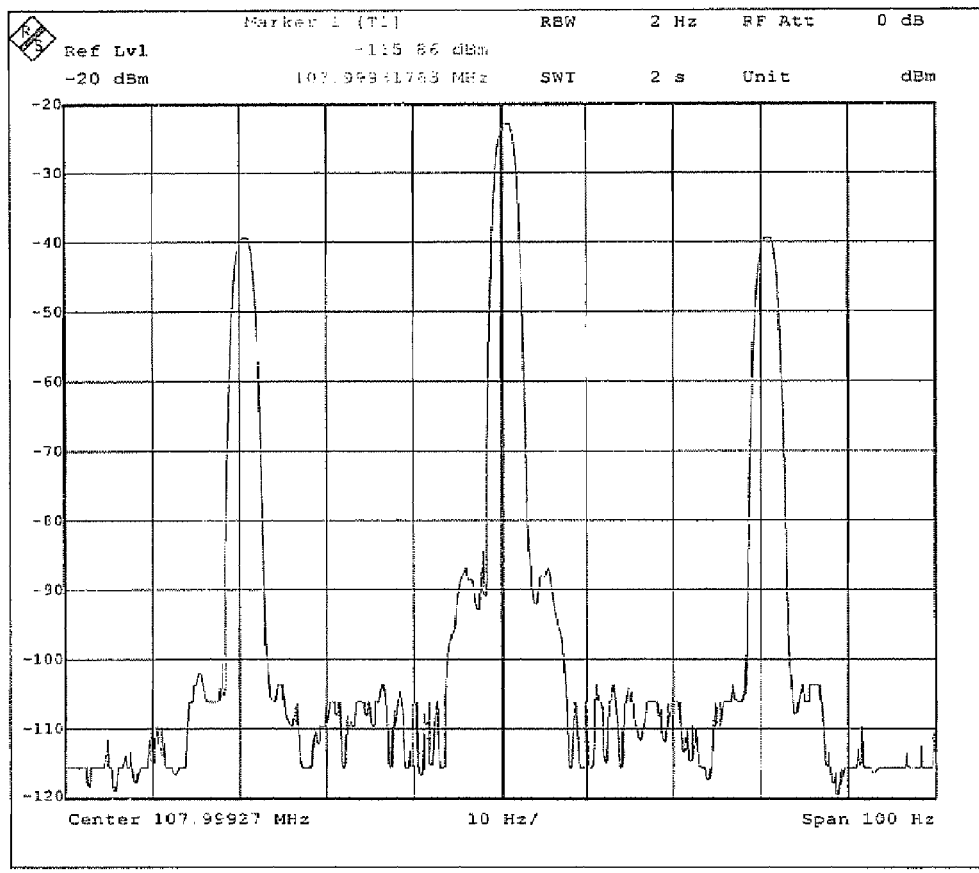
FIG. 3 is a graph illustrating spectral characteristics of 30 Hz amplitude modulation sidebands.
Figure 4:
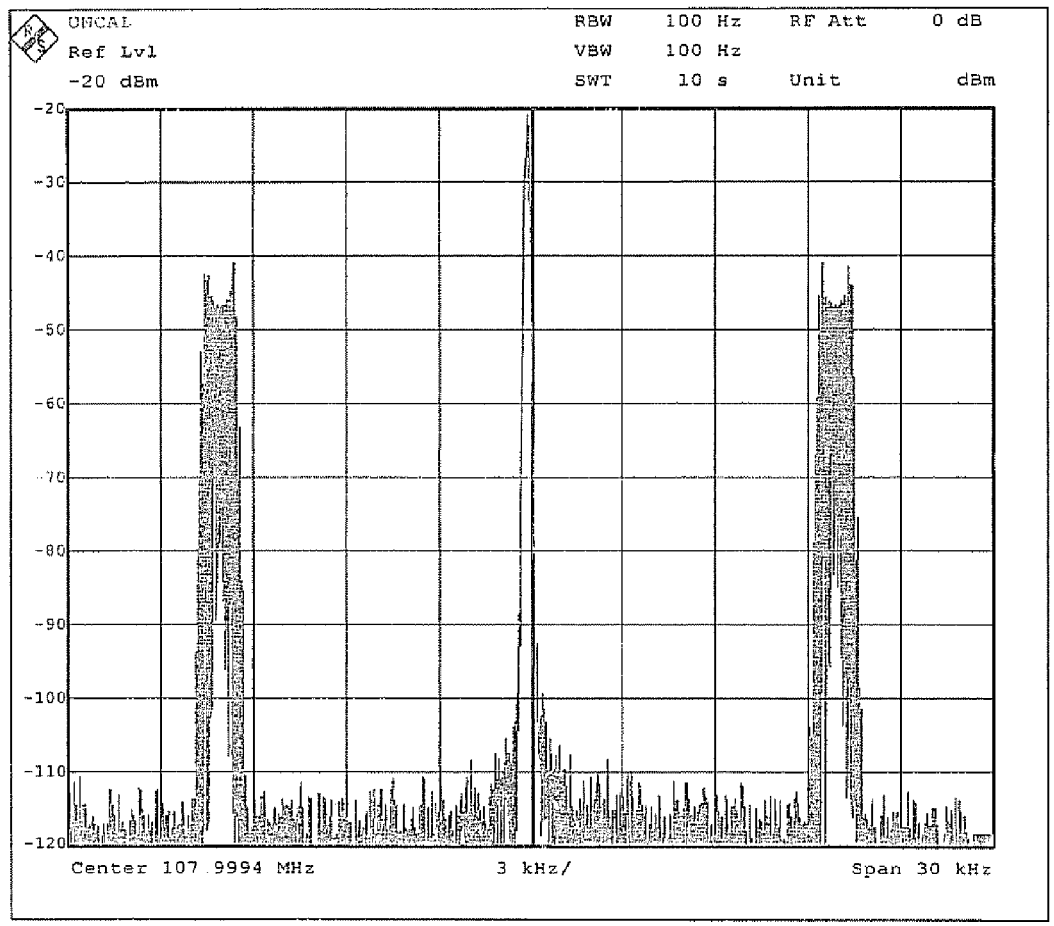
FIG. 4 is a graph illustrating spectral characteristics of 9960 Hz frequency modulation sidebands.

Example waveforms and screenshots are depicted in FIGS. 3-8. The waveforms were measured and validated using a Rohde and Schwarz FSIQ30 Vector Signal Analyzer. FIGS. 3 and 4 illustrate the narrowband and wideband spectral characteristics of the VOR waveform. Specifically, FIG. 3 illustrates the spectral characteristics of 30 Hz "variable" amplitude modulation, while FIG. 4 illustrates the spectral characteristics of a 9960 Hz "reference" frequency modulation.

Figure 5:
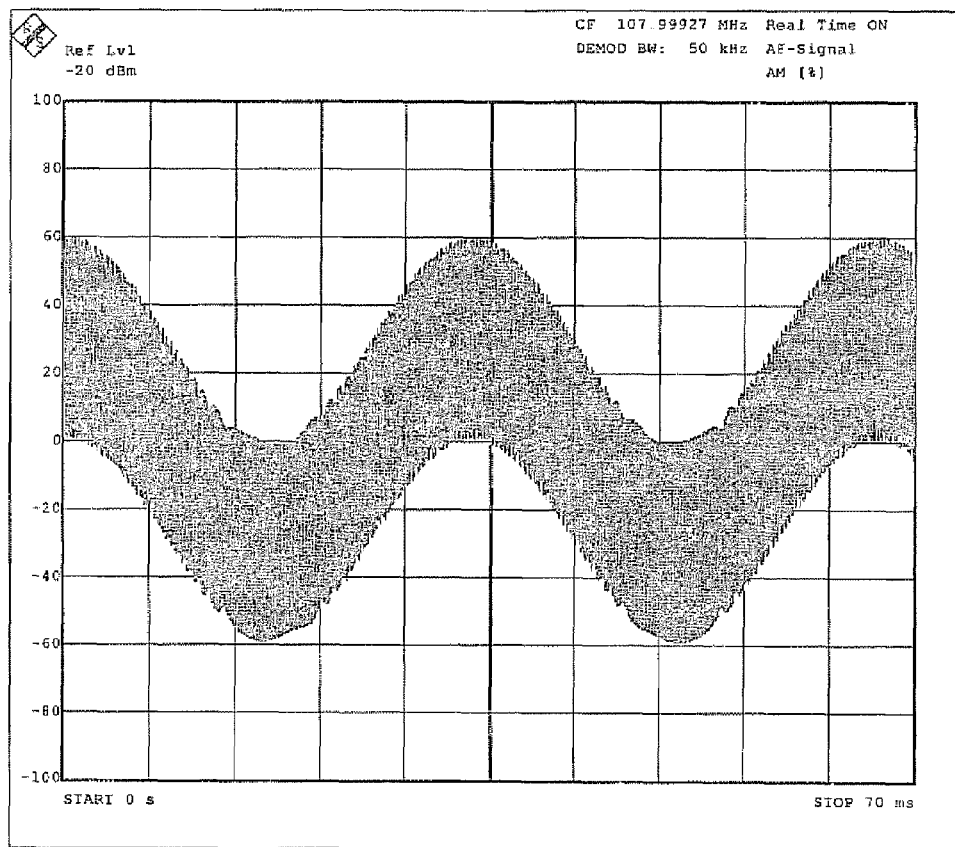
FIG. 5 is a graph illustrating a demodulated AM signal.
Figure 6:
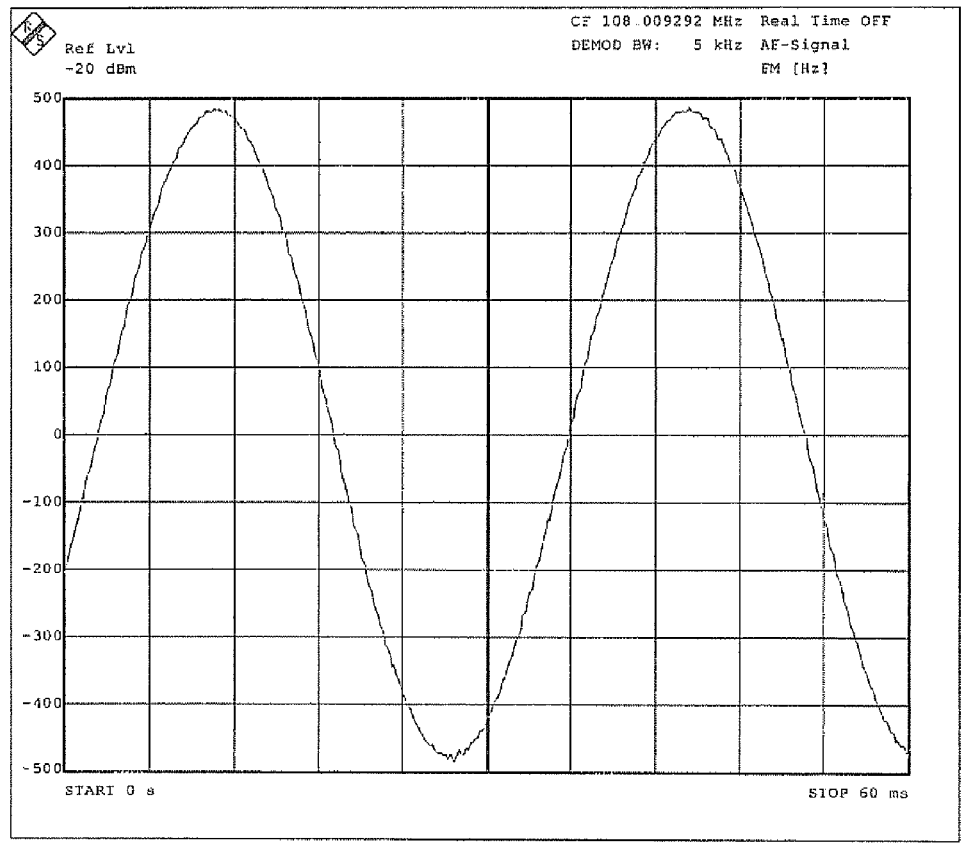
FIG. 6 is a graph illustrating an FM demodulated reference signal.

The time-domain waveform depicted in FIG. 5 illustrates the demodulated AM signal (composite VOR signal), while FIG. 6 illustrates the FM demodulated reference signal. FIG. 7 is a screen shot that illustrates some measurements performed on the 9960 Hz reference waveform. As seen in FIG. 7, the frequency of the FM signal is measured as expected as 30 Hz and the deviation of the FM signal is very close to the expected value of ±480 Hz (a modulation index of 16).

Figure 8:
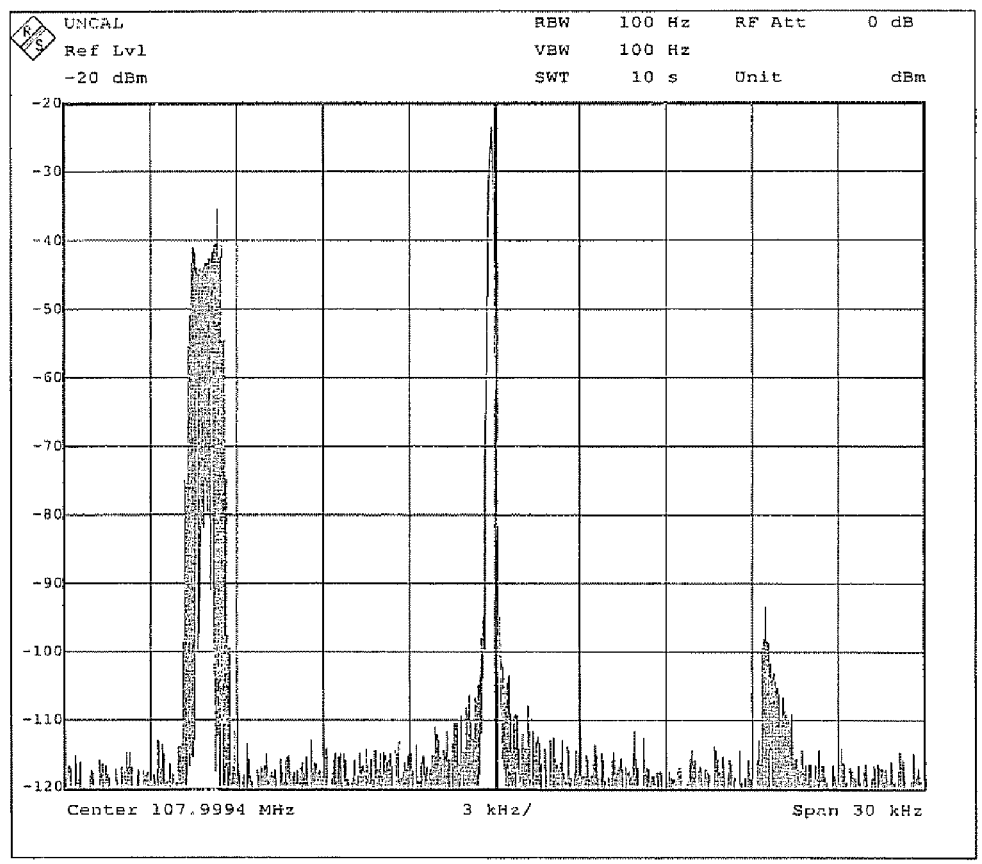
FIG. 8 is a graph illustrating sideband suppression properties of the signal generator depicted in FIG. 1.

FIG. 8 illustrates the single sideband suppression properties of the signal generator 104 using a VOR equation that always suppresses the lower sideband. By suppressing the lower sideband, sideband suppression is simpler to measure. Sideband suppression is measured at about 50 dB, which is more than sufficient to meet the ED-22B requirements of 20 dB. (See, Chapter 5, paragraph 5.2.3.3.b.)

The CVOR and DVOR waveforms were applied to the Honeywell NV-850 Primus II VOR and the Honeywell NV-877B EPIC VOR/ILS/DataLink (VIDL) unit. Bearing accuracy of the generated waveforms were as good as the waveforms generated by an industry standard VOR signal generator. Thus, the Agilent E4438C Vector Signal Generator used in conjunction with the Python program results in a system and method of generating VOR signals including various Doppler VOR signals that meets the accuracy requirements and intent of ED-22B. As a result, a VOR receiver may be more easily tested, while staying in compliance with requirements.

Similar techniques can be used to generate other airborne signals, such as Localizer and Glide Slope (including 'clearance' signals). This technique also provides an opportunity to eliminate the NAV signal simulator from the factory Automatic Test Equipment (ATE) rack that is used to test these products.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

Appendix A class VOR:
  def _init_(self,
  theta=0.0,#VOR Bearing
  Mr=0.3,#AM Percent modulation of REF signal (0.0<Mr<1.0)
  Mv=0.3,#AM Percent modulation of VAR signal (0.0<Mv<1.0)
  Md=0.4,#AM Modulation index of Doppler (0.0<Md<1.0)
  Mi=0.3,#AM Modulation index of IDENT tone
  Mc=16.0,#FM Modulation index of FM subcarrier. Peak dev=Mc*Fm Hz.
  Fm=30.0,#Frequency of 30 Hz ref/var signals
  Fd=30.0,#Frequency of Doppler signal (must be multiple of Fm)
  Fi=1020.0,#Frequency of the IDENT tone(must be multiple of Fm)
  Fc=9960.0,#Center of 9960 Hz FM subbcarrier (must be multiple of Fm)
  n=4,#Samples per 9960 cycle (oversampling)
  psi=0.0):#phase between carrer/var/ident and ref signal
  #Sanity Checks
  If(Fi%Fm)!=0:
  Fi=Fm*round(Fi/Fm)
  print "Warning:Fixing\"Fi\"so that it is a multiple of \"Fm\"."
  print "\"Fi\"set to %d."%Fi
  if(Fc%Fm)!=0:
  Fc=Fm * round(Fc/Fm)
  print "Warning: Fixing\"Fe\"so that it is a multiple of\"Fm\"."
  print "\"Fc\"set to %d."%Fc
  if(Fd%Fm)!=0:
  Fd=Fm * round(Fd/Fm)
  print "Warning: Fixing\"Fd\"so that it is a multiple of\"Fm\"."
  print "\"Fd\"set to %d."%Fd
  if(Mv=Mr)>1:
  print "Warning: AM Modulation is greater than 100%%."
  #Calculate waveform parameters
  Wm=2.0 * pi * Fm
  Wd=2.0 * pi Fd
  Wi=2.0 * pi Fi
  Wc=2.0 * pi Fc
  theta=theta * pi/180.0
  psi=psi * pi/180.0
  fs=n * Fc
  ts=1.0/fs
  #Setup time vector. Time vector is exactly 1/Fm seconds.
  t=arrange(0.0, 1.0/Fm, ts)
  Calculate the waveform 'pieces'
  self.ident=Mi*cos(Wi*t)
  self.ref=Mr*cos(Wc*t-Mc*sin(Wm*t))
  self.ref90=Mr*sin(Wc*t-Mc*sin(Wm*t))
  self.var=Mv*cos(Wm*t-theta)
  self.doppler=1.0=Md*cos(Wd*t)
  self.dop=cos(Wd*t)
  self.psi=psi class CVOR(VOR):
  def waveform(self):
  w=1.0=self.ident=self.var=self.ref
  return self.complex(w,w)

class DVOR(DOR):
  def waveform(self):
  w=1.0=self.ident=self.var=(self.ref*self.doppler)
  return self.complex(w,w)

class ADSB(VOR):
  def waveform(self):
  i=((1.0=self.ident=self.var)*cos(self.psi)=(1.0=self.ident=self.var)*self.ref90)
  q=((1.0=self.ident=self.var)*sin(self.psi)=(1.0=self.ident=self.var)*self.ref*sign(self.dop))
  return self.complex(i,q)

I claim:

1. A system for generating signals for testing a Very High Frequency Omnidirectional Range (VOR) receiver, comprising:
   a waveform generator that receives at least one equation defining an analog Doppler VOR signal, wherein the waveform generator generates repetitive discrete time sampled waveform data based on the at least one equation;
   a signal generator communicatively coupled to the waveform generator, wherein the signal generator receives the repetitive discrete time sampled waveform data from the waveform generator and uses the repetitive discrete time sampled waveform data to generate an analog Doppler VOR signal for testing a VOR receiver.

2. The system of claim 1, wherein the signal generator is a vector signal generator.

3. The system of claim 1, wherein the Doppler VOR signal is one of a double sideband Doppler VOR signal or an alternating sideband Doppler VOR signal.

4. A system for generating signals for testing a Very High Frequency Omnidirectional Range (VOR) receiver, comprising in combination:
   a computer that generates a discrete time sampled representation of at least one waveform based on at least one equation defining the waveform, wherein the waveform represents a waveform generated by a VOR ground station during operation of a VOR system; and
   a commercial off-the-shelf signal generator that receives the repetitive discrete time sampled representation of the at least one waveform from the computer and generates an analog VOR signal based on the repetitive discrete time sampled representation of the waveform, wherein the analog VOR signal is used for testing the VOR receiver.

5. The system of claim 4, wherein the at least one equation defines a waveform selected from the group of waveforms consisting of a classical VOR baseband signal, a double sideband Doppler VOR signal, and an alternating sideband Doppler VOR signal.

6. The system of claim 5, wherein the computer converts the at least one equation into a repetitive discrete time sampled waveform.

7. The system of claim 5, wherein the classical VOR baseband signal is represented as $vor(t)=1+m_v \cos(\omega_m t - \theta) + m_r \cos$ ($\omega_{sc}t-m_{sc}\sin(\omega_m t)$), where $m_v$ is a modulation index of variable signal, $m_r$ is a modulation index of reference signal, $m_{sc}$ is a deviation ratio of the FM subcarrier, $\omega_m$ is a radian frequency of reference and variable signal, $\omega_{sc}$ is a radian frequency of the FM subcarrier, and $\theta$= bearing to the VOR station.

8. The system of claim 5, wherein the double sideband Doppler VOR signal is represented by vor(t)=1+$m_v\cos(\omega_m t-\theta)$+$m_r\cos(\omega_{sc}t-m_{sc}\sin(\omega_m t))(1+m_d\cos(\omega_d t))$, where $m_v$ is a modulation index of variable signal, $m_r$ is modulation index of reference signal, $m_d$ is a modulation index of Doppler signal, $m_{sc}$ is a deviation ratio of the FM subcarrier, $\omega_m$ is a radian frequency of reference and variable signal, $\omega_d$ is a radian frequency of Doppler modulation, $\omega_{sc}$ is a radian frequency of the fm subcarrier, and $\theta$ is a bearing to the VOR station.

9. The system of claim 6, wherein the alternating sideband Doppler VOR signal is represented as $$\text{real}(\text{vor}(t))=(1+m_v\cos(\omega_m t-\theta))(\cos(\phi)+m_r\sin(\omega_m t-m_{sc}\sin(\omega mt)))$$

$$\text{imag}(\text{vor}(t))=(1+m_v\cos(\omega_m t-\theta))(\sin(\phi)+m_r\cos(\omega_m t-m_{sc}\sin(\omega mt)*\text{sign}(\omega_d t)$$

where $m_v$ is a modulation index of variable signal, $m_r$ is a modulation index of reference signal, $m_{sc}$ is a deviation ratio of the FM subcarrier, $\omega_m$ is a radian frequency of reference and variable signal, $\omega_d$ is a radian frequency of Doppler modulation, $\omega_{sc}$ is a radian frequency of the fm subcarrier, $\theta$ is a bearing to the VOR station, and $\phi$ is a phase between carrier and sidebands.

10. The system of claim 4, wherein the commercial off-the-shelf signal generator is a vector signal generator.

11. The system of claim 4, wherein the commercial off-the-shelf signal generator receives the at least one generated waveform via File Transfer Protocol (FTP) over an Ethernet connection.

12. A method for testing a Very High Frequency Omnidirectional Range (VOR) receiver, comprising;
receiving an input comprising at least one equation, wherein the at least one equation defines a waveform representing a waveform generated by a VOR ground station during operation of a VOR system;
converting the at least one equation into a discrete time sampled representation of the waveform;
generating an analog VOR signal based on the repetitive discrete time sampled waveform data; and
determining whether the VOR receiver accurately receives the analog VOR signal.

13. The method of claim 12, wherein the analog VOR signal is one of a classical VOR baseband signal, a double sideband Doppler VOR signal or an alternating sideband Doppler VOR signal.

14. The method of claim 12, wherein the repetitive discrete time sampled waveform is a $\frac{1}{30}^{th}$ second waveform sequence.

15. The method of claim 12, wherein the classical VOR baseband signal is represented as vor(t)=1+$m_v\cos(\omega_m t-\theta)$+$m_r\cos(\omega_{sc}t-m_{sc}\sin(\omega_m t))$, where $m_v$ is a modulation index of variable signal, $m_r$ is a modulation index of reference signal, $m_{sc}$ is a deviation ratio of the FM subcarrier, $\omega_m$ is a radian frequency of reference and variable signal, $\omega_{sc}$ is a radian frequency of the FM subcarrier, and $\theta$= bearing to the VOR station.

16. The method of claim 13, wherein the double sideband Doppler VOR signal represented by vor(t)=1 +$m_v\cos(\omega_m t-\theta)$+$m_r\cos(\omega_{sc}t-m_{sc}\sin(\omega_m t))(1+m_d\cos(\omega_d t))$, where $m_v$ is a modulation index of variable signal, $m_r$ is modulation index of reference signal, $m_d$ is a modulation index of Doppler signal, $m_{sc}$ is a deviation ratio of the FM subcarrier, $\omega_m$ is a radian frequency of reference and variable signal, $\omega_d$ is a radian frequency of Doppler modulation, $\omega_{sc}$ is a radian frequency of the fm subcarrier, and $\theta$ is a bearing to the VOR station.

17. The method of claim 12, wherein the alternating sideband Doppler VOR signal is represented as $$\text{real}(\text{vor}(t))=(1+m_v\cos(\omega_m t-\theta))(\cos(\phi)+m_r\sin(\omega_m t-m_{sc}\sin(\omega mt)))$$

$$\text{imag}(\text{vor}(t))=(1+m_v\cos(\omega_m t-\theta))(\sin(\phi)+m_r\cos(\omega_m t-m_{sc}\sin(\omega mt)*\text{sign}(\omega_d t)$$

where $m_v$ is a modulation index of variable signal, $m_r$ is a modulation index of reference signal, $m_{sc}$ is a deviation ratio of the FM subcarrier, $\omega_m$ is a radian frequency of reference and variable signal, $\omega_d$ is a radian frequency of Doppler modulation, $\omega_{sc}$ is a radian frequency of the fm subcarrier, $\theta$ is a bearing to the VOR station, and $\phi$ is a phase between carrier and sidebands.

* * * * *